United States Patent
Hou et al.

(10) Patent No.: US 6,324,184 B1
(45) Date of Patent: Nov. 27, 2001

(54) DYNAMIC BANDWIDTH ALLOCATION FOR A COMMUNICATION NETWORK

(75) Inventors: Victor T. Hou, La Jolla; Jonathon A. Fellows, Del Mar, both of CA (US)

(73) Assignee: General Instrument Corporation, Horsham, PA (US)

(*) Notice: Subject to any disclaimer, the term of this patent is extended or adjusted under 35 U.S.C. 154(b) by 0 days.

(21) Appl. No.: 09/148,760

(22) Filed: Sep. 4, 1998

Related U.S. Application Data

(63) Continuation of application No. PCT/US97/04163, filed on Mar. 17, 1997.
(60) Provisional application No. 60/014,230, filed on Mar. 18, 1996.

(51) Int. Cl.[7] .................................................. H04J 3/16
(52) U.S. Cl. ................................. 370/468; 370/470
(58) Field of Search .......................... 370/464, 468, 370/469, 470, 477, 478, 485, 480, 472, 476, 506, 508, 512

(56) References Cited

U.S. PATENT DOCUMENTS

| | | |
|---|---|---|
| 5,229,992 | 7/1993 | Jurkevich et al. . |
| 5,392,280 * | 2/1995 | Zheng ................................. 370/60 |
| 5,414,697 | 5/1995 | Osaki . |
| 5,513,174 * | 4/1996 | Punj ................................... 370/17 |
| 5,519,700 * | 5/1996 | Punj ................................. 370/60.1 |
| 5,533,008 * | 7/1996 | Grube et al. ........................ 370/17 |
| 5,784,569 * | 7/1998 | Miller et al. .................... 395/200.65 |
| 6,067,557 * | 5/2000 | Hegde ................................. 709/103 |

FOREIGN PATENT DOCUMENTS

| | | |
|---|---|---|
| 0 487 235 | 5/1992 | (EP) . |
| 0 522 391 | 1/1993 | (EP) . |

\* cited by examiner

*Primary Examiner*—Dang Ton
*Assistant Examiner*—Toan Nguyen
(74) *Attorney, Agent, or Firm*—Barry R. Lipsitz; Douglas M. McAllister

(57) ABSTRACT

Bandwidth is adaptively allocated in an upstream channel of a layered data communication network such as that used for carrying messages from a number of subscriber units (250, 252, . . . , 254) to a central controller (210), for example, to allow the subscriber units to send data for Internet access, videoconferencing, or voice communication. A running total of unallocated bandwidth (BWA(j)) is maintained in successive control intervals. A traffic count (C(i)) is determined for each subscriber unit by measuring the bandwidth which is used, for example, by counting the number of slots used in a control interval. The assigned bandwidth (B(i)) of the subscriber units is then adjusted when a ratio (K) of the traffic count to the assigned bandwidth is at or below a lower threshold (T1), and the running total of unallocated bandwidth is incremented by the decrease in the assigned bandwidth. The assigned bandwidth may be increased when a ratio (K) of the traffic count to the assigned bandwidth is at or above an upper threshold (T2) by distributing the unallocated bandwidth among the subscriber units. A subscriber unit hierarchy may be used to grant priority to selected users.

26 Claims, 5 Drawing Sheets

DYNAMIC BANDWIDTH ALLOCATION FOR A COMMUNICATION NETWORK

This application is a continuation of PCT/US97/04163 filed Mar. 17, 1997, which claims the benefit of U.S. provisional application No. 60/014,230, filed on Mar. 18, 1996.

BACKGROUND OF THE INVENTION

The present invention relates to the transmission of data in a layered data communication scheme, and is particularly applicable to the transmission of upstream messages in a hybrid fiber coaxial network. The invention is useful, for example, in allowing subscriber units to communicate messages to a central controller (e.g., cable television headend) for Internet access, videoconferencing, audio communication or the like. Bandwidth is dynamically allocated to subscribers of the network by the central controller according to the overall available bandwidth, the amount of bandwidth which is currently being used by each subscriber, and the number of current subscribers, among other factors.

In the past, cable television systems have utilized coaxial cable to carry signals from a headend to individual subscriber units. With the advent of new digital television services as well as the desire to carry data to and from subscriber units, the increased bandwidth provided by fiber optic cable has become attractive. Implementation of optical fiber networks all the way from the headend to individual subscriber units is not currently a practical alternative due to the high cost of building an optical fiber plant in which fiber is run all the way to individual homes. As a compromise, hybrid fiber coax (HFC) plants are being implemented. In HFC systems, fiber is run from the headend to neighborhood hubs. Existing coaxial cable is then coupled to receive the signals from the optical fiber, for distribution to individual homes.

Various interactive services to be provided by digital transmission systems require a bi-directional link between the central controller and individual subscriber units. One way to provide a return path from the subscriber units back to the central controller is to rely on existing telephone lines. However, it would clearly be advantageous to provide bi-directional communication over the same plant, such as an HFC plant, in which the downstream television signals are provided to the subscriber units. In order to accomplish this, proposals have been made to develop robust upstream communication networks over HFC plants. For example, single carrier frequency and time division multiple access (F/TDMA) have been proposed to provide a low risk, high capacity approach which offers suitable characteristics for upstream modulation over an HFC system.

In order to efficiently implement a practical upstream channel, it would be advantageous to allow the central controller to allocate bandwidth on an upstream channel according to the current subscriber demands. The central controller should have the capability to provide a minimum bandwidth to each subscriber, and to distribute bandwidth among users in an equitable manner. The central controller should also have the capability to provide priority to selected users, such as those who pay an additional fee. The scheme should be applicable to virtually any type of network, including networks which communicate television and/or other data signals, and should operate in a manner which is transparent to the subscriber units.

The present invention provides a communication scheme enjoying the above and other advantages.

SUMMARY OF THE INVENTION

A method and apparatus are presented for allocating bandwidth in a layered data communication network in which a plurality of subscriber units communicate with a central controller, e.g., for Internet access, videoconferencing, or voice communication.

The method includes the step of maintaining a running total of unallocated bandwidth in successive control intervals. A traffic count is determined for each subscriber unit, for example, by counting the number of slots used in a control interval. The slot usage rate corresponds to a bandwidth.

The assigned bandwidth of the subscriber units is then adjusted according to the traffic count. For example, the assigned bandwidth may be decreased when the currently assigned bandwidth exceeds the traffic count, e.g., by a programmable amount which is greater than or equal to zero. The assigned bandwidth can be set to equal the traffic count for each particular subscriber unit. Generally, bandwidth utilization is optimized by tailoring the assigned bandwidth to the subscriber unit's required bandwidth.

Optionally, to ensure that each subscriber unit is allocated a non-zero bandwidth, the assigned bandwidth may be set to the greater of (a) the traffic count for the particular subscriber unit, and (b) a minimum bandwidth, $R_{min}$. The running total of unallocated bandwidth is then incremented by the decrease in the assigned bandwidth for each subscriber unit. The running total of unallocated bandwidth carries over to subsequent control intervals (e.g., time intervals), where the assigned bandwidth is again adjusted.

Alternatively, a ratio of the traffic count to the assigned bandwidth for the particular subscriber unit may be determined, and the assigned bandwidth may be decreased when the ratio is at or below a lower utilization threshold, T1.

The assigned bandwidth may be increased for particular subscriber units according to the running total of unallocated bandwidth when the traffic count is at or near the currently assigned bandwidth. This may be accomplished by marking particular subscriber units for an increase in assigned bandwidth, and distributing the unallocated bandwidth among the marked subscriber units. For example, the unallocated bandwidth may be distributed equally to the marked subscriber units. Optionally, the assigned bandwidth for the subscriber units may be determined according to a subscriber unit hierarchy. For example, users who pay an additional fee may be granted various benefits, including priority access to unallocated bandwidth and/or a higher maximum (e.g., ceiling) bandwidth allocation. Additionally, assigned bandwidth may be based on a subscriber unit bandwidth usage history, time of day, or other factors.

Alternatively, a ratio of the traffic count to the assigned bandwidth for the particular subscriber units may be determined, and the assigned bandwidth may be increased when the ratio is at or above an upper utilization threshold, T2.

The bandwidth may be allocated in a transmission path between the subscriber units and the central controller, or in a transmission path between the central controller and another communication network.

A corresponding apparatus is also presented.

DETAILED DESCRIPTION OF THE INVENTION

The present invention provides a method and apparatus for dynamically allocating bandwidth among a plurality of subscriber units in an upstream channel of a communication network, such as a multichannel hybrid fiber coax (HFC) cable television system.

Figure 2:
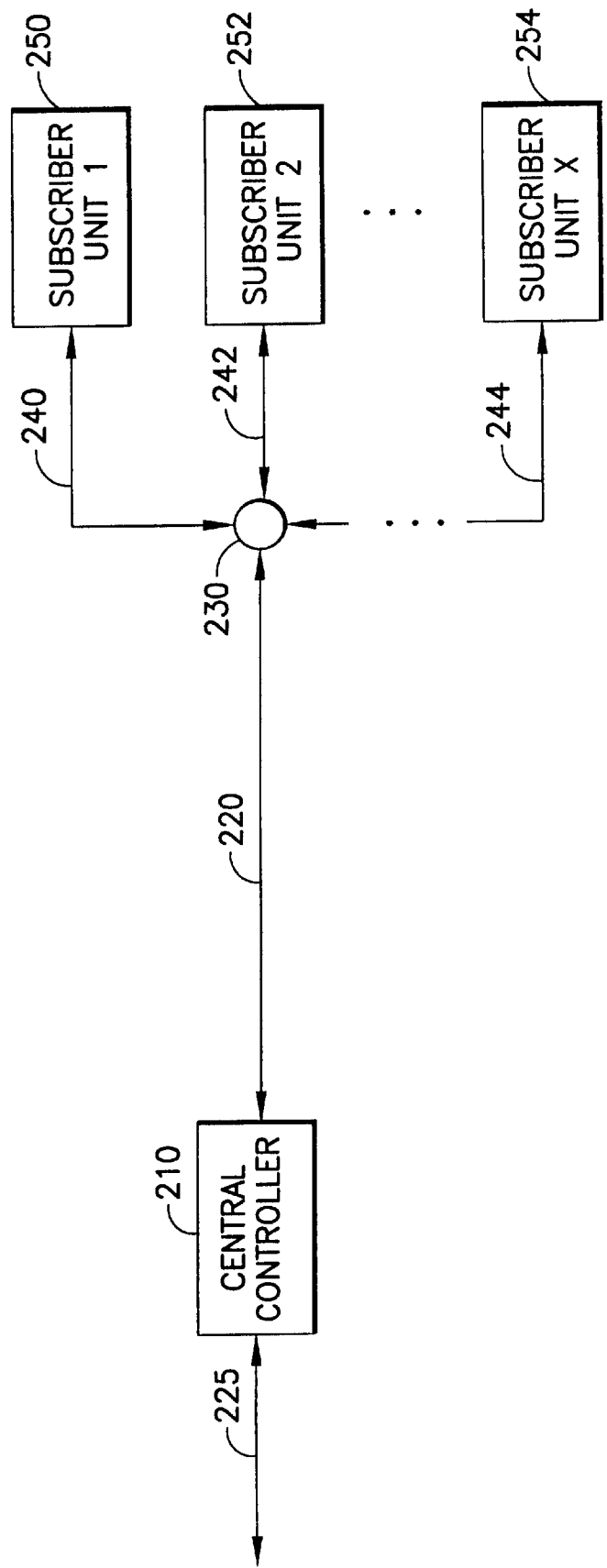
FIG. 2 is a block diagram of a bi-directional communication network in accordance with the present invention.

FIG. 2 is a block diagram of a bi-directional communication network in accordance with the present invention. A central controller 210 communicates signals such as television and/or other data signals to a plurality of subscriber units, including a first subscriber unit 250, a second subscriber unit 252 and an Xth subscriber unit 254. The central controller includes equipment that is located at one end of the HFC physical layer and medium access control layer. The term "central controller" is meant to be applicable to the location of a cable television network headend in addition to a controlling unit of virtually any other communication network, including, for example, satellite networks, radio networks, local area networks, wide area networks, intranets and the Internet. The "subscriber unit" is a unit at a subscriber's home or business that is located at another end of the HFC physical layer and MAC layer. The subscriber unit, which may alternatively be known as a set-top box, decoder, or terminal, is used by a subscriber to view programming services or other data on a television screen. Note that the term "subscriber" in meant to encompass any type of arrangement which allows a subscriber unit to communicate in a network regardless of whether a fee is paid or any other contractual arrangement exists. The HFC physical layer and MAC layer is thus terminated at separate ends by the central controller 210 and the respective subscriber units 250, 252 and 254.

In the hybrid fiber coax cable television system shown, a transmission path 220, e.g., such as an optical fiber, carries bi-directional signals between the central controller 210 and a hub 230. Coaxial cable 240, 242 and 244 is used to carry the signals between the hub 230 and the subscriber units 250, 252 and 254, respectively. Typically, additional hubs and branches and sub-branches of optical fiber and coaxial cable will be provided. However, it should be understood that the invention is equally suitable for use with an all-optical fiber system, an all-coaxial cable system, or virtually any other communication network, including wireless networks. Additionally, specific subscriber units can be grouped to share a common upstream channel. The central controller may communicate with a wide area network 225 to access various resources, such as other subscriber units, or storage media such as file servers, for example.

According to one embodiment of the present invention, the central controller 210 allocates bandwidth on the transmission path 220 to manage communications between the subscriber units and the central controller. The path 220 may comprise one or more channels which are shared among the subscriber units, for example according to known time division multiplex schemes. Optionally, the central controller 210 may also allocate bandwidth on the wide area network 225 to manage communications between other network resources and the central controller 210.

Figure 5:
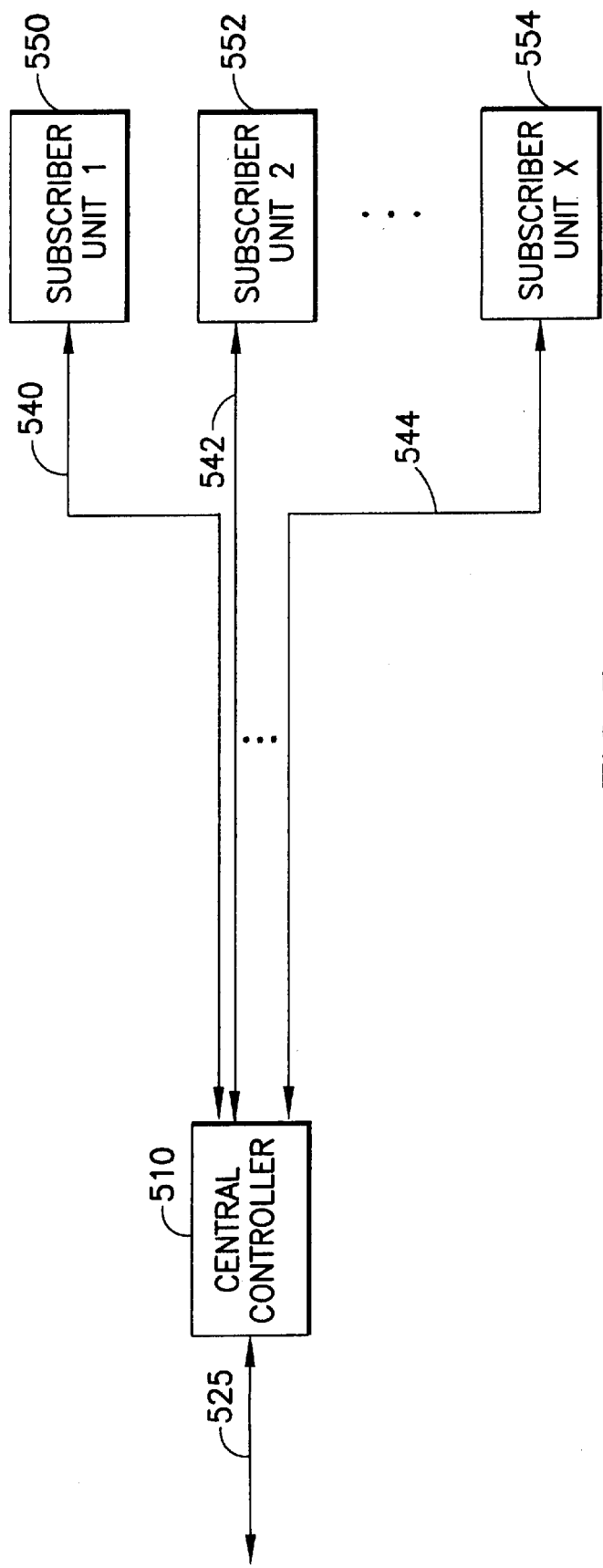
FIG. 5 is a block diagram of an alternative embodiment of a bi-directional communication network in accordance with the present invention.

FIG. 5 is a block diagram of an alternative embodiment of a bi-directional communication network in accordance with the present invention. Here, the subscriber units 560, 562, . . . , 554 communicate with the central controller 510 via independent transmission paths 540, 542, . . . , 544, respectively. The transmission paths 540, 542, . . . , 544 may be physically independent lines, and/or may be carried in a common line according to known wavelength multiplex schemes. The central controller 510 communicates via a wide area network 525 with other network resources. According to this alternative embodiment of the present invention, the central controller 510 allocates bandwidth on the transmission path 525 to manage communications between the other network resources and the central controller.

Figure 3:
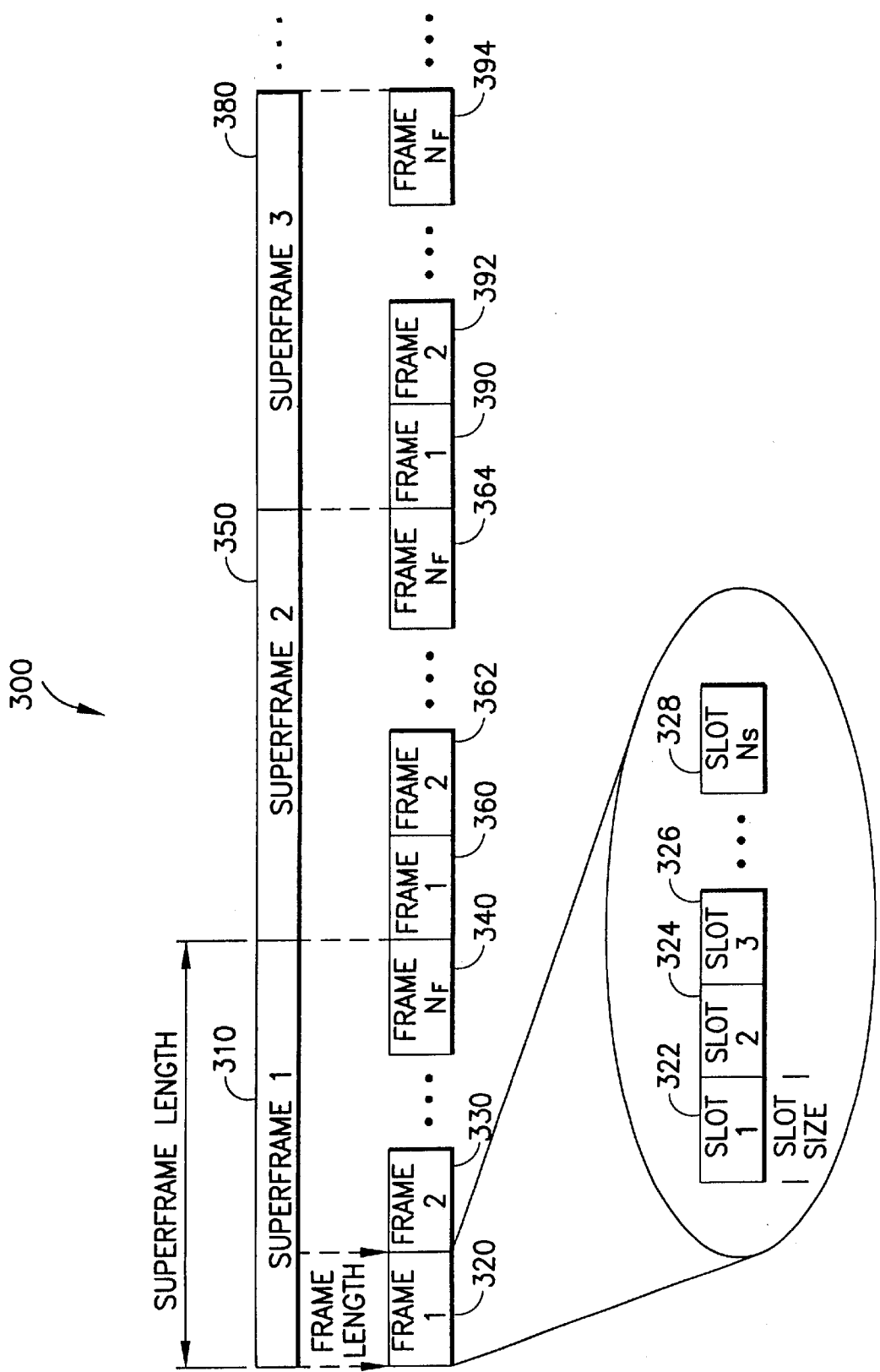
FIG. 3 is a diagrammatic illustration of a time division multiple access (TDMA) frame structure that can be used with the present invention.

FIG. 3 is a diagrammatic illustration of a time division multiple access (TDMA) frame structure which can be used with the present invention. A transport stream, shown generally at 300, includes first, second, and third superframes, denoted by reference numerals 310, 350 and 380, respectively. Each superframe is shown as being comprised of a number $N_F$ of frames, although the number of frames need not be the same in each superframe on different channels. In particular, the first superframe 310 includes frames 320, 330 . . . 340, the second superframe 350 includes frames 360, 362 . . . 364, and the third superframe 380 includes frames 390, 392 . . . 394. Furthermore, each frame is shown including a number $N_s$ of slots, although the number of slots need not be the same in each frame. For example, the first frame 320 of superframe 310 includes slots 322, 324, 326 and 328. Moreover, the size of each superframe, frame or slot may vary. Note also that the provision of superframes is not necessary, as only two layers need be provided in a TDMA communication scheme.

The MAC controls the upstream transmission from a subscriber unit in both frequency and time using Frequency and Time Division Multiple Access (F/TDMA). The MAC also supports unsynchronized access to the network as required. Multiple access modes can exist on the same channel by using resource management in the central controller. TDMA is the baseline access scheme for upstream transmission since it supports a high degree of programmability, easy reconfigurability and allows variable data rates. That is, the upstream TDMA is fully configurable and programmable in terms of slot size, frame size, superframe size, and frame format. The central controller MAC management entity controls the agile upstream frequencies and relays TDMA configuration parameters to the subscriber units.

Slot size is defined in terms of the number of timebase reference counts (e.g., ticks) the slot occupies. The reference tick is used to measure the passage of time for upstream transmission for a bit or a group of bits. The MAC management entity provides the subscriber units with slot size information during initialization and provisioning states. Frame size is expressed as the number of slots per frame, and is configurable across different frequency channels, thereby allowing a multitude of upstream data rates. Superframe size is expressed as the number of frames per superframe.

Each frame may optionally consist of a variable number of slots which are allocated for contention access, where two or more users compete for the same slot. The remainder of the frame can be used for either "fixed assigned" or "demand assigned" TDMA access. With fixed assigned access, slots are assigned to specific users. With demand assigned access, slots are assigned on an as-needed basis. It should be noted that the entire frame can be configured for contention based access, fixed access, dynamically assigned access, or any combination thereof. The MAC connection management function dynamically determines required frame composition based on user traffic requirements, as discussed below.

Figure 1:
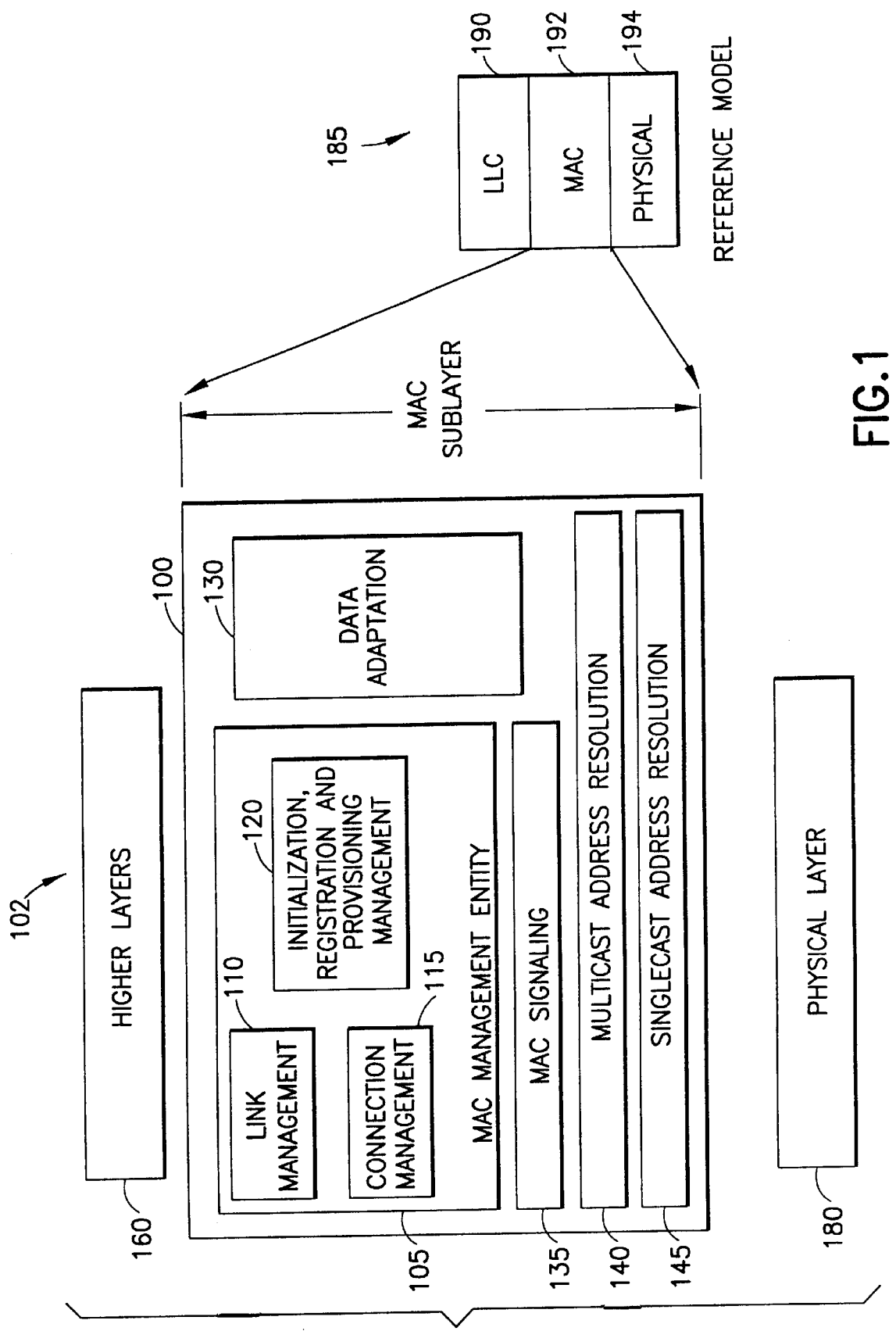
FIG. 1 is a diagrammatic illustration of a Medium Access Control (MAC) management entity for performing dynamic bandwidth allocation (DBA) in accordance with the present invention.

FIG. 1 is a diagrammatic illustration of a Medium Access Control (MAC) management entity for performing dynamic bandwidth allocation (DBA) in accordance with the present invention. The illustration is conceptual in that the MAC management entity, also referred to herein as simply MAC, is shown being implemented in a MAC sublayer of a data stream. As will be apparent to those skilled in the art, the functions of the MAC management entity described herein may be implemented in hardware and/or software at the central controller. A transport layer, shown generally at 102, includes a physical layer 180, a MAC sublayer 100, and higher layers 160. The MAC sublayer 100 includes a MAC management entity 105, which, in turn, includes a link management function 110, a connection management function 115, and an initialization, registration, and provisioning management function 120. The MAC sublayer 100 also includes a data adaptation function 130, a MAC signaling function 135, a multicast address resolution function 140, and a singlecast address resolution function 145.

A reference model (which corresponds to the IEEE 802 standard) is shown generally at 185, and includes a MAC layer 192 which corresponds to the MAC sublayer 100, a physical layer 194 which corresponds to the physical layer 180, and a logical link control (LLC) layer 190, which corresponds to the higher layers 160. The LLC layer 190 and MAC layer 192 are part of a data link layer. The MAC layer is the protocol that arbitrates access to the medium for the different users. The LLC layer controls communications over the data link.

The MAC management entity 105 performs the necessary control and management of downstream and upstream MAC resources. Upstream refers to communication from the subscriber units to the central controller, and downstream refers to communication from the central controller to the subscriber units. This management includes controlling initialization, provisioning and registration to enable entry into the network. The MAC management entity also controls connection management, which allows the establishment and release of network bandwidth resources, and link management, which provides control and calibration of link-related and power and ranging parameters. The MAC management entity also maintains databases related to subscriber units, security and key management, diagnostics, and network configuration.

The protocol employed by the MAC sublayer is independent of the physical modulation scheme and data rate used. This allows flexibility in implementing a common MAC signaling protocol across a variety of physical channel types. The physical modulation schemes include, but are not limited to, 256 QAM, 64 QAM, and QPSK.

The Data Adaptation function 130 provides adaptation services corresponding, for example, to the ATM Adaptation Layer 5 (AAL-5) standard, between the MAC signaling function 135, which provides HFC command messages, and the ATM layer.

The MAC controls the medium across the HFC. In the upstream direction, the medium should not be considered solely as one particular channel. The medium should be considered as the complete upstream spectrum, which may extend, for example, between 5–40 MHz in a cable television (CATV) system. However, it should be understood that virtually any spectrum in any network may be used. Thus, the MAC does more than arbitrate or control the access by users to a particular channel. It is also responsible for managing the bandwidth (both spectral bandwidth and data bandwidth) of the upstream spectrum, which may incorporate several channels, each having different bandwidths and data rates. It may also be advantageous for the MAC to accommodate various channels in which the channel rates differ.

Moreover, some regions of the upstream spectrum may have better error rate performance than other regions. Accordingly, it may be possible for the MAC to allocate data bandwidth on channels according to the type of service. For example, more critical data can be carried on channels with better error rate performance. Depending on the channel conditions, retransmission at the data link layer may be required.

Thus, with the above-mentioned perspective of controlling and managing the complete upstream medium, and criteria for selecting a MAC, key features of the MAC management entity of the present invention are as follows. First, the MAC should support asynchronous transfer mode (ATM) communications in an efficient and friendly way, including both upstream and downstream communications. The MAC should minimize overhead data at the data link layer and in the ATM cell. The MAC should support constant bit rate (CBR), variable bit rate (VBR), and available bit rate (ABR) type services. The MAC should provide for contention access, complete non-contention access for data connections, or both. The MAC should further include a data link layer retransmission scheme and error monitoring function for the upstream channels, which, due to well-known and observed narrowband ingress, can be a problematic medium. Finally, the MAC should include a time-division multiple access (TDMA) synchronization scheme that operates independently of downstream modulation type, symbol rate, and framing structure.

The MAC can optionally provide access for power-up and initialization via contention slots. A contention slot is a slot that can be allocated to a number of users, and is not reserved for a particular user. Furthermore, contention slots can be configured on one or multiple upstream channels, in which case the subscriber units are informed of the channel frequency, framing structure (e.g., the number of slots per frame), and slot numbers via an invitation message, which is broadcast periodically by the central controller. Synchronization may be achieved using a variety of methods including, for example, the use of timebase synchronization messages. It can be assumed that no power-up slots exist on the channel since the MAC management entity at the central controller can choose to perform power-up on a particular channel and move users to other channels when the power-up and initialization sequence is completed.

For session communication, a contention mechanism can be employed. A simple frame structure may be used in which contention slots and assigned slots are contained in a frame. Contention may involve attempts to make a reservation, attempts to transmit data, or a combination of both. Various contention access approaches have been proposed. Contention schemes generally require additional overhead, may be subject to stability problems, and may pose certain power control problems related to large numbers of users that are involved in a collision, wherein a number of users are requesting access to the same slot at the same time. In addition, the criteria for detection of a collision and the associated false alarm probabilities (i.e., a false collision) must be determined.

It should be noted that many contention-based random access schemes do achieve a high degree of stability at high loads and into overload. However, access delays at high loads may be larger than certain alternatives. One alternative is to provide a guaranteed bandwidth at some minimum level, as disclosed in the preferred embodiment herein. In other words, when a subscriber unit has access to at least one assigned time slot, the MAC management entity can assign a minimum bandwidth to the subscriber unit. Minimum bandwidth is a configurable parameter, as discussed below.

The MAC may be an ATM-based system, where ATM signaling is employed to set up ATM connections, and there is an ATM-MAC interface in which the ATM signaling informs the MAC management entity about connections, associated traffic contract, and quality of service parameters. Quality of service parameters generally indicate the bit rate of the connection, and include a constant bit rate (CBR), a variable bit rate (VBR), and an unspecified bit rate (UBR). Note that even if a connection has an unspecified bit rate (UBR), the MAC management entity knows that a particular subscriber unit has active connections in place.

In addition to the assignment of a minimum bandwidth, dynamic bandwidth allocation (DBA) is used in accordance with the present invention to provide efficient utilization of upstream bandwidth among the subscriber units. Therefore, the DBA should work in conjunction with the guaranteed minimum bandwidth, as well as the different quality of service levels. The ATM layer expects the MAC layer to provide for quality transport of ATM cells from the subscriber units to the central controller in the upstream direction. Moreover, the ATM and MAC layers are expected to exchange signaling information and user information.

During ATM connection set-up, the ATM layer provides signaling information to the MAC layer to reserve MAC-level resources if they are available. This signaling information may request a quality of service class and traffic parameters in the traffic contract, for example. Traffic parameters relate to items such as peak cell rate, sustainable cell rate, minimum and maximum cell rates, and delay variation tolerance, and are specified in the traffic contract. A traffic contract refers to criteria which is established for an ATM connection setup. For the lifetime of each established ATM connection, the MAC layer maintains the quality of ATM cell transport according to the quality of service and traffic parameter agreement in the traffic contract. When adding or deleting ATM connections over the MAC layer, the MAC layer must not affect the quality of ATM cell transport on other already-existing ATM connections.

The following example shows how MAC-level bandwidth may be managed for a subscriber unit that may have multiple ATM connections simultaneously. Initially, when no ATM connections are established across the HFC link, the minimum bandwidth, $R_{min}$, is set to a default, which is used for ATM signaling traffic. When ATM connections are set up, $R_{min}$ is increased depending on the requested quality of service class and traffic parameters in the traffic contract, as follows:

(1) If a constant bit rate (CBR) is selected, then $R_{min}=R_{min}+PCR$, where PCR is the specified peak cell rate;
(2) If a real-time variable bit rate (VBR) or non-real-time VBR is selected, then $R_{min}=R_{min}+SCR$, where SCR is the specified sustainable cell rate;
(3) If an unspecified bit rate (UBR) is selected, then $R_{min}$ is unchanged; and
(4) If the available bit rate (ABR) is selected, then $R_{min}=R_{min}+MCR$, where MCR is the minimum cell rate. ABR is supported by user network interface (UNI) 4.0 signaling.

After the connection has been established, dynamic bandwidth allocation (DBA) processing occurs. Advantageously, DBA can optimize use of the available bandwidth in the upstream transmission path from the subscriber units to the central controller, while also maintaining a minimum bandwidth for each subscriber unit. Moreover, when the ATM connection is terminated, the minimum bandwidth, $R_{min}$, may be decreased accordingly.

The TDMA structure which is assumed for the MAC for implementing DBA is as follows. The MAC assumes that the upstream slots are organized in a framing structure. For example, two levels of framing may be specified, including a frame level, which is the level at which slot assignments are managed by the central controller, and a superframe level, which relates to TDMA synchronization. The frame 320 is shown having an integral number $N_F$ of slots, while each superframe similarly has an integral number of frames. In particular, the length of a superframe is the rollover value of the master timebase clock, which is the clock tick count at which the master timebase counter goes back to zero. In other words, the master timebase clock is a modulo-M counter in which M is the superframe length in ticks.

One objective of the DBA scheme of the present invention is to provide a system which does not require involvement from the subscriber units. The subscriber units receive bandwidth (e.g., slot) assignments and reduce the required MAC layer overhead in the upstream and downstream directions. The subscriber units do not need to send a signal to the central controller to request bandwidth or report the subscriber unit buffer size. Accordingly, the DBA scheme is essentially transparent to the subscriber units, so that conventional subscriber units may be employed.

The subscriber units are initialized by being authenticated, registered, assigned a MAC address, ranged, power controlled, and assigned encryption parameters. The subscriber units are then assigned a slot or slots which correspond to a minimum amount of bandwidth (e.g., $R_{min}$). When a cable modem or the like of the subscriber unit moves from an inactive state to an active state, e.g., when a switched virtual circuit has been established between the ATM switch and the subscriber unit, the central controller may increase the minimum amount of upstream bandwidth which is assigned to the subscriber unit.

For example, if a connection of the constant bit rate (CBR) quality of service class has been set up, the minimum upstream bandwidth should be at least the sustainable cell rate (SCR) which corresponds to the CBR connection. Even with multiple unspecified bit rate (UBR) connections in place, the minimum bandwidth can be increased from the default (e.g., initial) amount.

The central controller adjusts the bandwidth which is allocated to the subscriber units in the upstream transmission path at the end of each control interval. There are j=1, . . . , L total upstream channels, and $X_j$ total users in the jth channel. For the ith user in the jth channel, a cable data modem at the central controller maintains a traffic count $C_i$ on each user over one or more control intervals. Each user is allocated an information bandwidth $B_i$, which may correspond, for example, to a number of slots per frame, data rate in bits or bytes per second, or cell rate in an ATM network. Over a control interval, the ith user will have had $B_i$ slots assigned to it. The cable data modem and a cable data modem termination system at the central controller maintain a record of the number of assigned slots per frame, $S_i$, for each user. The cable data modem termination system also maintains a count of the number of active users on each channel, and tracks the aggregate amount of allocated bandwidth, BW(j), for each channel.

Figure 4:
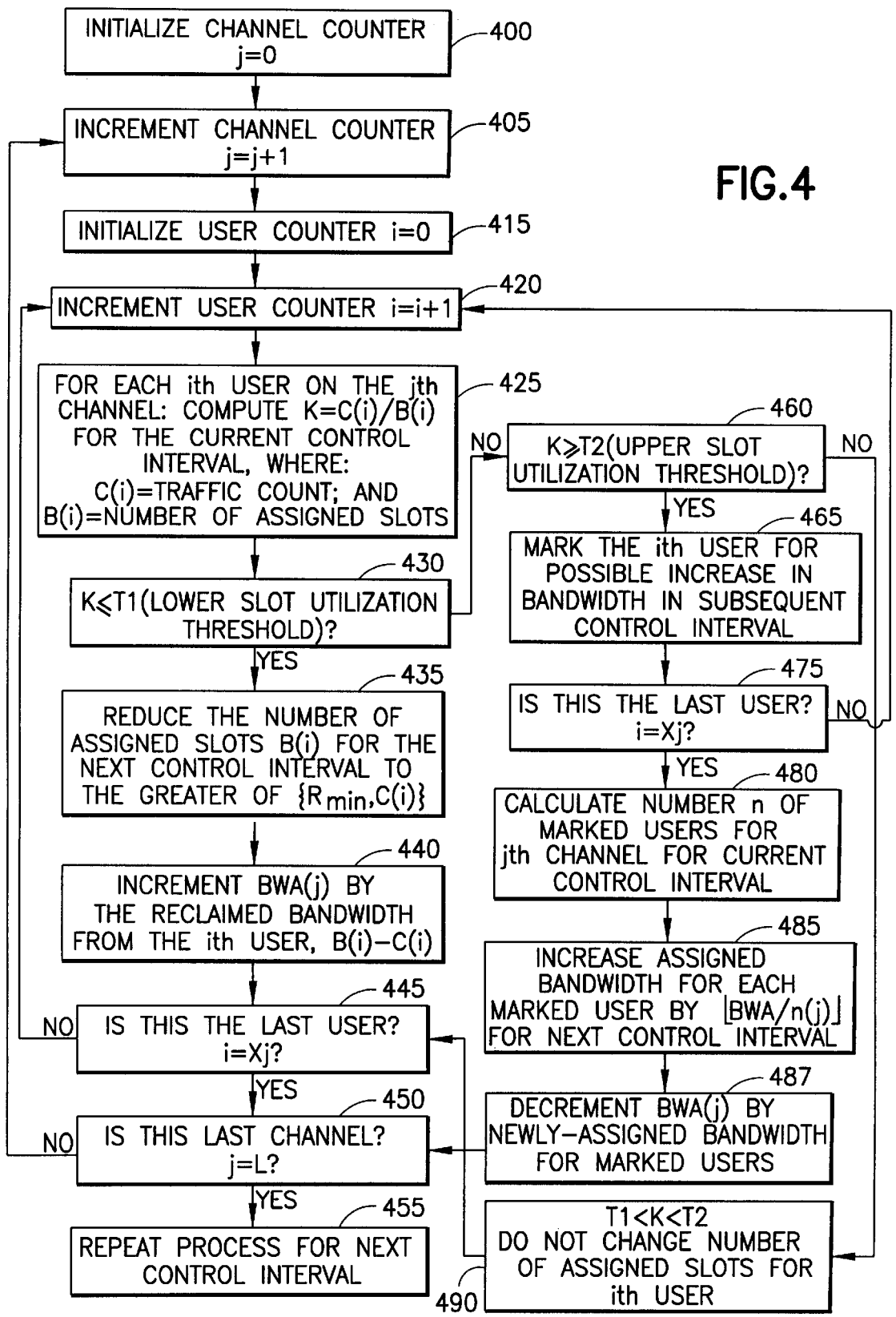
FIG. 4 is a flowchart of the dynamic bandwidth allocation scheme in accordance with the present invention.

FIG. 4 is a flowchart of the dynamic bandwidth allocation scheme in accordance with the present invention. Relevant parameters include the number of slots per frame, bandwidth per slot, number of frames per control interval, number of users per channel, and lower and upper utilization thresholds. In the process shown, the bandwidth can be allocated (i.e., adjusted) for each user in each channel in successive control intervals. Each channel has a number $X_j$ of users, where i=1, . . . , $X_j$ indicates the ith user in the jth channel. Control intervals are time increments which may be synchronized with a number of slots, frames, and/or superframes of a channel, although synchronization is not mandatory. Moreover, the control interval may be adjusted so that control intervals of differing durations are provided in a single channel or in multiple channels.

First, a channel counter j is initialized at block 400, where j=1, . . . , L channels. At block 405, the channel counter is incremented. For example, j=1 indicates that the first channel is being processed. Note that when more than one channel is provided, each channel may be processed serially or in parallel. The process of FIG. 4 shows each channel and each user being processed serially for illustration purposes only. Additionally, not every channel or user need be processed in each control interval. For example, some channels and users may be processed in one control interval, while other channels and users are processed in another control interval. The central controller first initializes a pool of unallocated bandwidth, BWA(j), in the current channel. BWA(j) is a running total which is maintained over successive control intervals, and indicates the amount of unallocated bandwidth available in a given control interval. Note that, in the present example, bandwidth will be considered in terms of slots, although virtually any available measure of data may be used. Thus, bandwidth corresponds directly to a number of slots (or frames, or superframes, or the like) which are allocated to a subscriber for upstream transmission in a control interval.

A user counter is initialized at block 415. At block 420, the user counter is incremented. For example, the first user (i=1) may be processed first. At block 425, for each ith user on the jth channel, a ratio K=C(i)/B(i) is computed, where C(i) is the traffic count of the current user over a control interval, and B(i) is the number of assigned slots over the control interval. That is, C(i) is the number of slots that the current user actually used to transmit data upstream over the control interval, as determined by the MAC management entity at the central controller. B(i) is the number of slots which the MAC management entity has assigned to the user for the control interval. Note that the size and number of the slots corresponds to a bandwidth, so that C(i) corresponds to a bandwidth which is consumed by the user, and B(i) corresponds to a bandwidth which is allocated (e.g., assigned) to the user.

At block 430, a determination is made as to whether K<=T1, where T1 is a lower utilization threshold, which may be 0.85, for example. If K<=T1, the MAC management entity reduces the assigned bandwidth B(i) for the ith user in the next control interval (or a successive control interval) to the bandwidth which was actually used (e.g., C(i)) or $R_{min}$, whichever is greater. $R_{min}$ is optionally provided as a minimum bandwidth allocation. The process of FIG. 4 is known as a non-contention system since each user is provided with a minimum bandwidth. However, note that this does not necessarily indicate that each user is provided with one or more slots in each frame or control interval. Generally, the minimum bandwidth requirement will correspond to an average data rate, or slots per unit time rate, over a frame or control interval.

At block 440, the reclaimed bandwidth (e.g., the reduction in the assigned bandwidth, B(i)–C(i)) is added to the pool of available bandwidth, BWA(j). Next, at block 445, a determination is made as to whether the current user is the last user in the channel (e.g., i=$X_j$). If not, the flow proceeds to block 420, where the user counter is incremented to process the next user on the channel. If i=$X_j$, the process proceeds to block 450, where a determination is made as to whether the current channel is the last channel (e.g., j=L). If not, the flow proceeds to block 405, where the channel counter is incremented to process the next channel. However, if j=L, the entire bandwidth assignment process, beginning at block 400, is repeated for the next control interval, or a subsequent control interval. Generally, allocation of bandwidth in each control interval provides optimal throughput on the upstream channels.

Returning to block 430, if K>T1, the flow proceeds to block 460, where a determination is made as to whether K>=T2, where T2 is an upper utilization threshold, which may be in the range 0.90 to 1.0, for example. If not, then the currently assigned bandwidth is matched to the user's requirements, and there is no change in the number of assigned slots, as indicated at block 490. Note that T1 and T2 are adjustable. The flow then proceeds to block 445, discussed above. At block 460, if K>=T2, then at block 465, the current user is marked for a possible increase in assigned bandwidth in a subsequent control interval. This can be accomplished by storing a user identifier and the appropriate status in a memory, then accessing the stored data in a subsequent control interval. At block 475, a determination is made as to whether the current user is the last user in the channel (e.g., i=$X_j$). If not, the flow returns to block 420, discussed above.

If i=$X_j$, then at block 480, the MAC management entity calculates the number n of marked users in the current channel for the current control interval. At block 485, the assigned bandwidth for each of the n users is increased by BWA(j)/n rounded down to the next integer if BWA(j)/n is non-integral. That is, the available unallocated bandwidth is distributed evenly among the marked users. Note that BWA (j) may not have a zero value after this step since, in the case of TDMA slots, for example, non-integral numbers of slots cannot be allocated. For example, assume there are n=12 marked users in the current channel and control interval, and that the current balance of BWA(j) is 40 slots. Thus, at block 485, each of the 12 users may be assigned an additional 40/12=3.33 slots. To avoid assigning fractional slots, the floor function of 3.33 is taken (e.g., floor(3.33)=3). Accordingly, each of the marked users may be assigned three additional slots, and the remaining balance for BWA(j) is 12×0.33=4 slots. These four slots may be distributed among the marked users or carried over to a subsequent control interval.

In particular, when BWA(j)/n corresponds to a non-integral number of slots, the MAC management entity can perform a second or even third step to distribute as much of the remaining balance of BWA(j) as possible in the current control interval. For instance, when there is a remainder of four slots after the first distribution, these slots can be distributed among the 12 marked users randomly or in a predetermined order, e.g., on a rotation basis. If a non-integral number of unallocated slots remain even after one or more distributions, the remaining balance can be carried over to a subsequent control interval. Finally, the flow then proceeds to block 487, where BWA(j) is decremented by the newly-assigned bandwidth for the marked users, and to block 450, discussed above. If fractional slot values are assigned for B(i), this will be manifested in B(i) in a subsequent control interval.

Moreover, BWA(j) can optionally be allocated according to a user (e.g., subscriber unit) hierarchy. For example, premium users who pay an additional fee can be given priority in receiving additional bandwidth. This may be accomplished by providing each user with a weighting factor which the central controller can retrieve from a memory. For example, a non-premium user can be assigned a weighting factor of "1", while a premium user is assigned a weighting factor of "2". Then, using the above example, where BWA(j)=40 slots, and there are 12 users, and further assuming 6 premium users and 6 non-premium users, each premium user can be allocated $40 \times 2/18 = 4.4$ slots (e.g., rounded down to four slots), while each non-premium user is allocated $40 \times 1/18 = 2.2$ slots (e.g., rounded down to two slots). The fractions $2/18$ and $1/18$ were obtained by taking the ratio of the weight of the user to the sum of the weights of all marked users. Such a weighting scheme is particularly effective when unallocated bandwidth is infrequently available, as the premium users will be the first to receive any available unallocated bandwidth.

Furthermore, it is possible to limit the maximum bandwidth that a user is assigned by comparing the assigned bandwidth to a ceiling value which is stored in a memory. The ceiling value may further be adjusted according to the user hierarchy discussed above, so that higher-priority users are given a higher ceiling bandwidth.

Additionally, there may be a concern that the DBA scheme never reduces the assigned bandwidth of a user when the user continually uses all of its assigned bandwidth. Such a situation may be unfair to other network users. In this case, some of the bandwidth (e.g., slot) assignment of the user in question can be redistributed to other users who use all or most of their assigned bandwidth, for example, in a shuffled manner, where each such user receives the new slots in a predetermined order, such as in a rotation, or in a random order. Alternatively, or in addition, a maximum (e.g., ceiling) bandwidth can be imposed on the user. Furthermore, it is possible to use a timing mechanism to provide a heavy user with additional bandwidth, but only for a certain amount of time. In a further option, the MAC management entity may maintain a historical record of bandwidth usage for each user. Then, users who have relatively low usage levels may be given higher priority when requesting a bandwidth level that might otherwise be limited. The MAC management entity may further allocate bandwidth according to a historical profile of total channel bandwidth usage. For example, a user bandwidth ceiling may be increased during off-peak network hours. Other variations in the bandwidth allocation scheme of the present invention will become apparent to those skilled in the art.

Accordingly, it can be seen that the dynamic bandwidth allocation scheme of the present invention optimizes channel usage in a communication network by tailoring the assigned bandwidth to actual user requirements. A medium access control management entity at the central controller of a cable television system or the like monitors bandwidth usage in upstream channels, and adjusts the assigned bandwidth for each user accordingly. The management entity may be implemented in hardware and/or software. A guaranteed minimum bandwidth may also be provided for each user. Moreover, the scheme can be adapted for use with a hierarchy of users, wherein premium users, such as those who pay an additional fee, can be granted priority over other users.

Although the invention has been described in connection with various disclosed embodiments, it should be appreciated that various adaptations and modifications may be made thereto without departing from the scope of the invention as set forth in the claims.

What is claimed is:

1. A method for allocating bandwidth in a layered data communication network in which a plurality of subscriber units communicate with a central controller, comprising the steps of:

maintaining a running total of unallocated bandwidth in successive control intervals;

determining a traffic count of each of said subscriber units;

adjusting an assigned bandwidth of said subscriber units according to said traffic count; and modifying said running total of unallocated bandwidth according to the adjustment in the assigned bandwidth; wherein:

bandwidth is allocated in at least one of (a) a transmission path between said subscriber units and said central controller, and (b) a transmission path between said central controller and another communication network.

2. The method of claim 1, comprising the further step of:

determining a ratio of the traffic count to the assigned bandwidth for a particular one of said subscriber units; and increasing the assigned bandwidth of the particular subscriber unit when said ratio is at or above an upper utilization threshold.

3. The method of claim 1, wherein:

said traffic count is determined according to a bandwidth which is used by the respective subscriber units.

4. A method for allocating bandwidth in a layered data communication network in which a plurality of subscriber units communicate with a central controller, comprising the steps of:

maintaining a running total of unallocated bandwidth in successive control intervals;

determining a traffic count of each of said subscriber units;

adjusting an assigned bandwidth of said subscriber units according to said traffic count;

modifying said running total of unallocated bandwidth according to the adjustment in the assigned bandwidth; and decreasing the assigned bandwidth of a particular one of said subscriber units when the currently assigned bandwidth exceeds the traffic count by a programmable amount.

5. The method of claim 4, wherein:

said decreasing step includes the step of adjusting the assigned bandwidth of said particular subscriber unit to approximately equal the traffic count for said particular subscriber unit.

6. The method of claim 4, wherein:

said decreasing step includes the step of adjusting the assigned bandwidth of said particular subscriber unit to the greater of (a) the traffic count for said particular subscriber unit, and (b) a minimum bandwidth.

7. The method of claim 4, comprising the further step of:
incrementing said running total of unallocated bandwidth by the decrease in said assigned bandwidth in said decreasing step.

8. A method for allocating bandwidth in a layered data communication network in which a plurality of subscriber units communicate with a central controller, comprising the steps of:
maintaining a running total of unallocated bandwidth in successive control intervals;
determining a traffic count of each of said subscriber units;
adjusting an assigned bandwidth of said subscriber units according to said traffic count;
modifying said running total of unallocated bandwidth according to the adjustment in the assigned bandwidth;
determining a ratio of the traffic count to the assigned bandwidth for the particular subscriber unit; and
decreasing the assigned bandwidth of the particular subscriber unit when said ratio is at or below a lower utilization threshold.

9. A method for allocating bandwidth in a layered data communication network in which a plurality of subscriber units communicate with a central controller, comprising the steps of:
maintaining a running total of unallocated bandwidth in successive control intervals;
determining a traffic count of each of said subscriber units;
adjusting an assigned bandwidth of said subscriber units according to said traffic count;
modifying said running total of unallocated bandwidth according to the adjustment in the assigned bandwidth; and
increasing the assigned bandwidth of a particular one of said subscriber units according to said running total of unallocated bandwidth when the traffic count exceeds a predetermined level;
wherein said increasing step comprises the steps of:
marking at least one particular subscriber unit for an increase in assigned bandwidth; and
distributing at least part of said unallocated bandwidth among the marked subscriber unit(s).

10. A method for allocating bandwidth in a layered data communication network in which a plurality of subscriber units communicate with a central controller, comprising the steps of:
maintaining a running total of unallocated bandwidth in successive control intervals;
determining a traffic count of each of said subscriber units;
adjusting an assigned bandwidth of said subscriber units according to said traffic count;
modifying said running total of unallocated bandwidth according to the adjustment in the assigned bandwidth; and
adjusting said assigned bandwidth of said subscriber units according to a subscriber unit hierarchy.

11. An apparatus for allocating bandwidth in a layered data communication network in which a plurality of subscriber units communicate with a central controller, comprising:
means for maintaining a running total of unallocated bandwidth in successive control intervals;
means for determining a traffic count of each of said subscriber units;
means for adjusting an assigned bandwidth of said subscriber units according to said traffic count; and
means for modifying said running total of unallocated bandwidth according to the adjustment in the assigned bandwidth; wherein:
bandwidth is allocated in at least one of (a) a transmission path between said subscriber units and said central controller, and (b) a transmission path between said central controller and another communication network.

12. The apparatus of claim 11, further comprising:
means for determining a ratio of the traffic count to the assigned bandwidth for a particular one of said subscriber units; and
means for increasing the assigned bandwidth of the particular subscriber unit when said ratio is at or above an upper utilization threshold.

13. The apparatus of claim 11, wherein:
said traffic count is determined according to a bandwidth which is used by the respective subscriber units.

14. An apparatus for allocating bandwidth in a layered data communication network in which a plurality of subscriber units communicate with a central controller, comprising:
means for maintaining a running total of unallocated bandwidth in successive control intervals;
means for determining a traffic count of each of said subscriber units;
means for adjusting an assigned bandwidth of said subscriber units according to said traffic count;
means for modifying said running total of unallocated bandwidth according to the adjustment in the assigned bandwidth; and
means for decreasing the assigned bandwidth of a particular one of said subscriber units when the currently assigned bandwidth exceeds the traffic count by a programmable amount.

15. The apparatus of claim 14, wherein:
said means for decreasing adjusts the assigned bandwidth of said particular subscriber unit to approximately equal the traffic count for said particular subscriber unit.

16. The apparatus of claim 14, wherein:
said means for decreasing adjusts the assigned bandwidth of said particular subscriber unit to the greater of (a) the traffic count for said particular subscriber unit, and (b) a minimum bandwidth.

17. The apparatus of claim 14, further comprising:
means for incrementing said running total of unallocated bandwidth by the decrease in said assigned bandwidth.

18. An apparatus for allocating bandwidth in a layered data communication network in which a plurality of subscriber units communicate with a central controller, comprising:
means for maintaining a running total of unallocated bandwidth in successive control intervals;
means for determining a traffic count of each of said subscriber units;
means for adjusting an assigned bandwidth of said subscriber units according to said traffic count;
means for modifying said running total of unallocated bandwidth according to the adjustment in the assigned bandwidth;

means for determining a ratio of the traffic count to the assigned bandwidth for the particular subscriber unit; and means for decreasing the assigned bandwidth of the particular subscriber unit when said ratio is at or below a lower utilization threshold.

19. An apparatus for allocating bandwidth in a layered data communication network in which a plurality of subscriber units communicate with a central controller, comprising:

means for maintaining a running total of unallocated bandwidth in successive control intervals;

means for determining a traffic count of each of said subscriber units;

means for adjusting an assigned bandwidth of said subscriber units according to said traffic count;

means for modifying said running total of unallocated bandwidth according to the adjustment in the assigned bandwidth; and means for increasing the assigned bandwidth of a particular one of said subscriber units according to said running total of unallocated bandwidth when the traffic count exceeds a predetermined level; wherein:

said means for increasing is adapted to mark at least one particular subscriber unit for an increase in assigned bandwidth; and at least part of said unallocated bandwidth is distributed among the marked subscriber unit(s).

20. An apparatus for allocating bandwidth in a layered data communication network in which a plurality of subscriber units communicate with a central controller, comprising:

means for maintaining a running total of unallocated bandwidth in successive control intervals;

means for determining a traffic count of each of said subscriber units;

means for adjusting an assigned bandwidth of said subscriber units according to said traffic count;

means for modifying said running total of unallocated bandwidth according to the adjustment in the assigned bandwidth; and means for adjusting said assigned bandwidth of said subscriber units according to a subscriber unit hierarchy.

21. A method for allocating bandwidth in a layered data communication network in which a plurality of subscriber units communicate with a central controller, comprising the steps of:

maintaining a running total of unallocated bandwidth in successive control intervals;

determining a traffic count of each of said subscriber units;

adjusting an assigned bandwidth of said subscriber units according to said traffic count;

modifying said running total of unallocated bandwidth according to the adjustment in the assigned bandwidth;

decreasing the assigned bandwidth of a particular one of said subscriber units when the currently assigned bandwidth exceeds the traffic count by a programmable amount; and incrementing said running total of unallocated bandwidth by the decrease in said assigned bandwidth in said decreasing step.

22. A method in accordance with claim 21, wherein:

said decreasing step includes the step of adjusting the assigned bandwidth of said particular subscriber unit to approximately equal the traffic count for said particular subscriber unit.

23. A method in accordance with claim 21, wherein:

said decreasing step includes the step of adjusting the assigned bandwidth of said particular subscriber unit to the greater of (a) the traffic count for said particular subscriber unit, and (b) a minimum bandwidth.

24. An apparatus for allocating bandwidth in a layered data communication network in which a plurality of subscriber units communicate with a central controller, comprising:

means for maintaining a running total of unallocated bandwidth in successive control intervals;

means for determining a traffic count of each of said subscriber units;

means for adjusting an assigned bandwidth of said subscriber units according to said traffic count;

means for modifying said running total of unallocated bandwidth according to the adjustment in the assigned bandwidth;

means for decreasing the assigned bandwidth of a particular one of said subscriber units when the currently assigned bandwidth exceeds the traffic count by a programmable amount; and means for incrementing said running total of unallocated bandwidth by the decrease in said assigned bandwidth.

25. The apparatus of claim 24, wherein:

said means for decreasing adjusts the assigned bandwidth of said particular subscriber unit to approximately equal the traffic count for said particular subscriber unit.

26. The apparatus of claim 24, wherein:

said means for decreasing adjusts the assigned bandwidth of said particular subscriber unit to the greater of (a) the traffic count for said particular subscriber unit, and (b) a minimum bandwidth.

* * * * *